(12) United States Patent
Andersen

(10) Patent No.: US 6,216,464 B1
(45) Date of Patent: Apr. 17, 2001

(54) PROCESS AND UNIT FOR THE COMBINED PRODUCTION OF AMMONIA SYNTHESIS GAS AND POWER

(75) Inventor: Henrik Solgaard Andersen, Søborg (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 09/292,352

(22) Filed: Apr. 15, 1999

Related U.S. Application Data

(60) Provisional application No. 60/081,926, filed on Apr. 16, 1998.

(51) Int. Cl.[7] .................................................... F01K 13/00
(52) U.S. Cl. .............................................. 60/645; 60/670
(58) Field of Search ............................. 60/645, 651, 670, 60/671

(56) References Cited

U.S. PATENT DOCUMENTS

| | | | | |
|---|---|---|---|---|
| 4,308,128 | * | 12/1981 | Cummings | 208/86 |
| 4,442,020 | * | 4/1984 | Fuderer | 252/373 |
| 4,671,893 | * | 6/1987 | Pinto | 252/376 |
| 5,624,964 | * | 4/1997 | Cimini et al. | 518/704 |
| 5,705,916 | * | 1/1998 | Rudbeck et al. | 322/2 R |
| 5,937,631 | * | 8/1999 | Holm-Larsen et al. | 60/39.02 |

* cited by examiner

Primary Examiner—Hoang Nguyen
(74) Attorney, Agent, or Firm—Ostrolenk, Faber, Gerb & Soffen

(57) ABSTRACT

A process for the combined production of synthesis gas and power, comprising the steps of primary and secondary steam reforming of a hydrocarbon feedstock, wherein part of the synthesis gas being withdrawn from the secondary steam reforming at high pressure is expanded in a gas turbine for the production of power and the expanded synthesis gas is utilized as fuel in the primary steam reforming step.

3 Claims, 1 Drawing Sheet

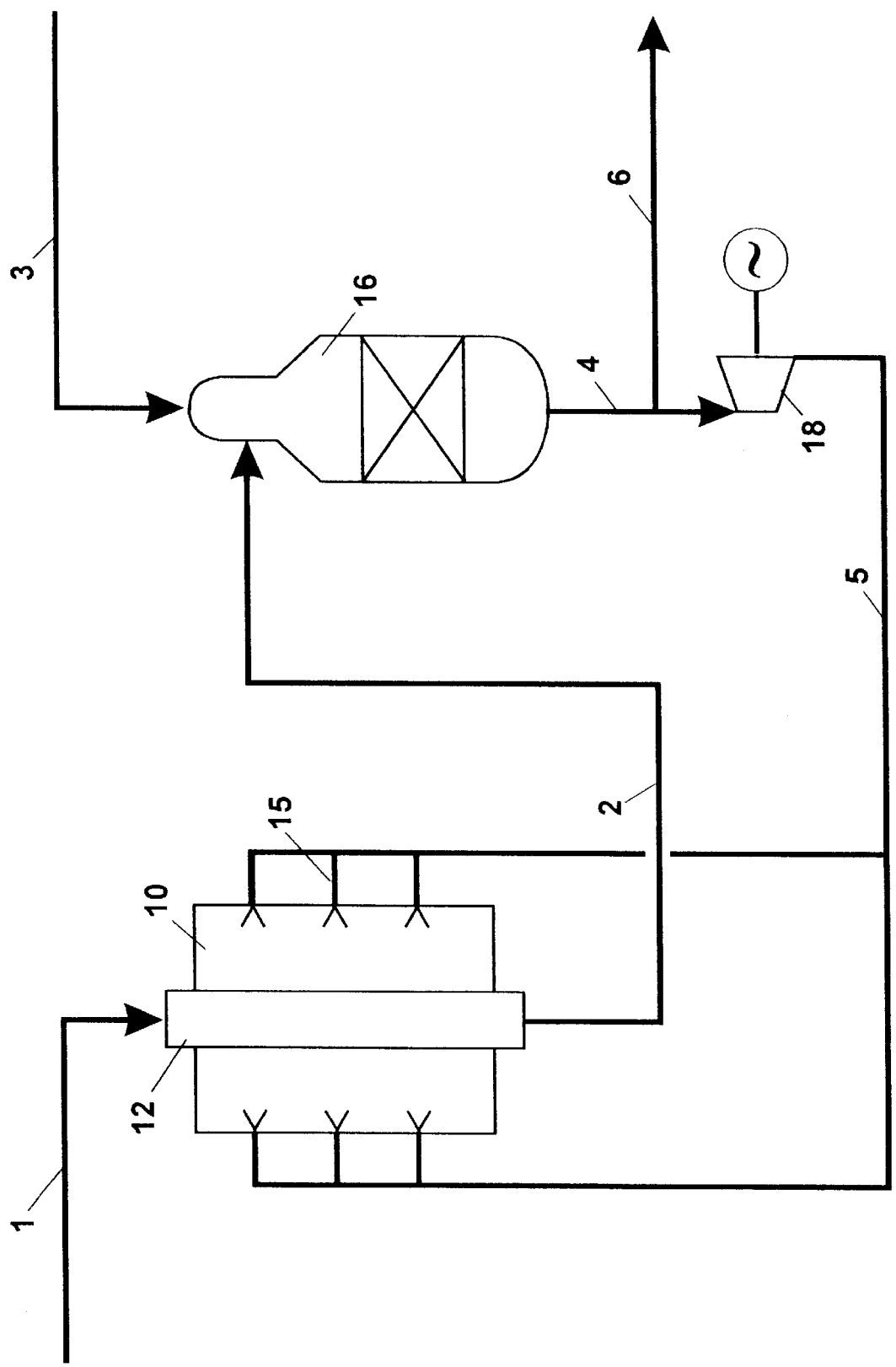

PROCESS AND UNIT FOR THE COMBINED PRODUCTION OF AMMONIA SYNTHESIS GAS AND POWER

This application claims the benefit of U.S. Provisional Application No. 60/081,926, filed on Apr. 16, 1998.

BACKGROUND OF THE INVENTION

The present invention relates to the production of synthesis gas and power by primary and secondary steam reforming of a hydrocarbon feedstock, wherein part of the synthesis gas being withdrawn from the secondary steam reforming at high pressure is expanded in a gas turbine for the production of power and the expanded synthesis gas is utilized as fuel in the primary steam reforming step.

Preparation of synthesis gas by a sequence of primary and secondary steam reforming of a hydrocarbon feed stock is a well-known process in the art. The process is conventionally performed in a sequence of a fired tubular steam reformer and an adiabatic combustion reactor with a top combustion zone and a bottom catalyst zone. In the combustion zone, hydrocarbon feedstock is partially oxidized with air or oxygen containing atmosphere. Partially oxidized effluent from the combustion zone is subsequently subjected to steam reforming in presence of a steam reforming catalyst arranged in fixed bed manner in the bottom part of the reactor. Typical operation conditions in the adiabatic reformer are 850° C. and 2–4 MPa at steam to carbon ratios above 1, depending on the desired product gas.

A problem with adiabatic steam reforming is the formation of soot in the substoichiometric combustion of hydrocarbons. In particular, at low steam/carbon ratios in the feed gas to the adiabatic reformer, soot is formed markedly in the combustion zone.

In a number of industrial applications, a low steam to carbon ratio is required in the feed gas. Thus, in the manufacture of hydrogen and carbon monoxide, synthesis gas steam to carbon ratios below 1 are advantageous to obtain the optimum hydrogen to carbon monoxide ratio in the product gas.

Several attempts to reduce soot formation at low steam to carbon ratios in adiabatic reforming have been made in the past, including specific burner designs and control of operation conditions.

In co-pending European Patent Application No. 99102386, a process for soot free adiabatic catalytic steam reforming is described, wherein formation of soot is avoided by controlling the operation pressure within a certain range depending on the adiabatic gas temperature of the reformed feedstock and the steam to carbon ratio.

It was, furthermore, found that operation pressures above 3.5 MPa allow soot free reforming at a very low steam to carbon ratio.

A disadvantage of operating at high operation pressure in the adiabatic steam reforming process is the expense involved in compression of the feed gas. The pressure of produced synthesis gas will be typically required at a lower pressure for application in subsequent process units.

SUMMARY OF THE INVENTION

It has now been found that substantial amounts of energy used in the compression of feed gas to an autothermal reformer without formation of soot is regained when depressurizing a part of the produced synthesis gas being withdrawn from the reformer at high pressure in a gas turbine for the generation of power, and utilizing the expanded portion of the gas as fuel in a fired tubular steam reformer.

Accordingly, the present invention provides a process for the combined production of synthesis gas and power, comprising the steps of primary and secondary steam reforming of a hydrocarbon feedstock, wherein part of the synthesis gas being withdrawn from the secondary steam reforming at high pressure is expanded in a gas turbine for the production of power, and the expanded synthesis gas is utilized as fuel in the primary steam reforming step.

Other features and advantages of the present invention will become apparent from the following description of the invention which refers to the accompanying drawings.

BRIEF DESCRIPTION OF THE DRAWING

The sole drawing FIGURE shows the process flow for the preferred embodiment of the invention.

DETAILED DESCRIPTION OF THE PREFERRED EMBODIMENT

A specific embodiment of the invention is schematically shown in the drawing.

In the process shown in FIG. 1, process gas 1 of a hydrocarbon feedstock and steam is, in a first step, steam reformed in a tubular steam reformer 10. Steam reformer 10 contains a fixed bed of conventional steam reforming catalyst 12 which is externally heated by burning fuel in burners 15.

As an essential feature of the invention, fuel used in the heating of the steam reforming catalyst is a part steam 5 of synthesis gas prepared by the process as further described below.

From catalyst bed 12, primary steam reformed stream 2 is autothermal withdrawn and introduced into secondary reformer 16 together with a stream of oxidant 3. In secondary reformer 16, primary steam reformed stream 2 is further steam reformed by the known secondary steam reforming process. The conditions and catalyst employed in reactor 16 are conventional and are summarized in the table below. From reactor 16, steam reformed ammonia synthesis gas 4 is withdrawn and distributed partly to product line 6, and the remainder of the stream is passed to gas turbine 18, where the gas is expanded to produce rotational shaft power. Expanded synthesis gas 5 from gas turbine 18 is then burned in burners 15 to provide heat in primary reformer 10. The process conditions and composition of the different gas streams in the above process are summarized in the table below.

TABLE

| | Stream No. | | | | |
|---|---|---|---|---|---|
| | 1 | 2 | 3 | 4 | 5 |
| Flow, Nm$^3$/h | 208,184 | 257,176 | 65,133 | 344,258 | 68,852 |
| Pressure, Kg/cm$^2$ | 39.5 | 36 | 37 | 35.5 | 1.5 |
| Temperature, ° C. | 635 | 809 | 550 | 973 | 454 |
| Composition, Mole % | | | | | |
| $H_2$ | 13.60 | 39.46 | — | 37.42 | 37.42 |
| $N_2$ | 2.01 | 1.10 | 77.61 | 15.51 | 15.51 |
| $O_2$ | — | — | 20.88 | — | — |
| $H_2O$ | 47.95 | 39.45 | 0.55 | 31.96 | 31.96 |

TABLE-continued

| | Stream No. | | | | |
|---|---|---|---|---|---|
| | 1 | 2 | 3 | 4 | 5 |
| $CH_4$ | 30.95 | 7.46 | — | 0.41 | 0.41 |
| $C_2$ | — | — | — | — | — |
| CO | 0.15 | 6.18 | — | 9.43 | 9.43 |
| $CO_2$ | 5.31 | 6.33 | 0.03 | 5.09 | 5.09 |
| Ar | 0.03 | 0.02 | 0.90 | 0.18 | 0.18 |

Gas turbine power: 15.8 MW.

As apparent from the above Table, 15.8 MW power are produced by the above process when expanding about 20% by volume of produced synthesis gas in a gas turbine.

Although the present invention has been described in relation to particular embodiments thereof, many other variations

What is claimed is:

1. A process for the combined production of synthesis gas and power, comprising the steps of primary and secondary steam reforming of a hydrocarbon feedstock, wherein part of the synthesis gas being withdrawn from the secondary steam reforming at high pressure is expanded in a gas turbine for the production of power, and the expanded synthesis gas is utilized as fuel in the primary steam reforming step.

2. A process unit for the combined production of synthesis gas and power, comprising:
   a fuel heated primary steam reformer connected to a secondary steam reformer;
   a gas turbine connected to an outlet line of the secondary steam reformer for expansion of at least part of the produced synthesis gas withdrawn through the outlet line of the secondary steam reformer; and
   a line for passing the expanded synthesis gas to burner means arranged in the primary steam reforming reactor.

3. A process for the preparation of a hydrogen and/or carbon monoxide rich synthesis gas with reduced formation of soot, comprising the steps of introducing a hydrocarbon feed stream into a tubular steam reforming process and subsequently at a pressure of at least 3.5 Mpa into an autothermal steam reforming process thereby converting the feed stream to a hydrogen and/or carbon monoxide rich synthesis gas stream;
   withdrawing a part of the synthesis gas stream at elevated pressure; depressurizing the withdrawn synthesis gas stream in an expansion step for generation of electrical power; and
   utilizing said depressurized gas stream as fuel in said tubular steam reforming process.

* * * * *